US008388840B2

(12) United States Patent
Augier et al.

(10) Patent No.: US 8,388,840 B2
(45) Date of Patent: Mar. 5, 2013

(54) SYSTEM FOR STIFFENING THE PLATES OF A LARGE-DIAMETER MULTI-STAGE COLUMN

(75) Inventors: Frederic Augier, Saint Symphorien D Ozon (FR); Denis Darmancier, Vienne (FR); Gerard Hotier, Rueil Malmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 119 days.

(21) Appl. No.: 12/796,930

(22) Filed: Jun. 9, 2010

(65) Prior Publication Data
US 2011/0056880 A1 Mar. 10, 2011

(30) Foreign Application Priority Data
Jun. 10, 2009 (FR) ...................................... 09 02803

(51) Int. Cl.
*B01D 15/00* (2006.01)
(52) U.S. Cl. ........ 210/264; 210/269; 210/283; 210/284; 210/289; 210/293; 210/335; 210/489; 210/492; 422/632; 422/212; 422/223
(58) Field of Classification Search .................. 210/264, 210/268, 269, 283, 284, 285, 289, 290, 293, 210/335, 339, 489, 492, 498; 422/632, 212, 422/223
See application file for complete search history.

(56) References Cited

U.S. PATENT DOCUMENTS

| 142,722 | A | * | 9/1873 | Pearson | 210/257.1 |
| 308,575 | A | * | 11/1884 | Puffer | 210/151 |
| 651,173 | A | * | 6/1900 | Weaver | 210/264 |
| 801,943 | A | * | 10/1905 | Weaver | 210/696 |
| 4,726,935 | A | | 2/1988 | Inatsune et al. | |
| 5,302,357 | A | | 4/1994 | Kramer et al. | |
| 5,603,904 | A | | 2/1997 | Bachtel et al. | |
| 6,000,094 | A | * | 12/1999 | Young | 15/264 |
| 2006/0108274 | A1 | | 5/2006 | Frey et al. | |

FOREIGN PATENT DOCUMENTS

| EP | 0 074 815 A2 | 3/1983 |
| EP | 0 190 413 A2 | 8/1986 |
| WO | WO 2006/027118 A1 | 3/2006 |

OTHER PUBLICATIONS

Search Report of FR 0902803 (Jan. 12, 2010).

* cited by examiner

*Primary Examiner* — Matthew O Savage
(74) *Attorney, Agent, or Firm* — Millen, White, Zelano & Branigan, P.C.

(57) ABSTRACT

Device for stiffening the plates of a multi-stage column with a diameter of more than 2 meters, whereby each plate supports a particle bed and the flow of at least one fluid passes through it from top to bottom, whereby said device consists of a number of beams that are located under the plate in question, each beam having a lower surface that is shaped like a triangle.

15 Claims, 7 Drawing Sheets

[Key:]

Temps = Time

SYSTEM FOR STIFFENING THE PLATES OF A LARGE-DIAMETER MULTI-STAGE COLUMN

FIELD OF THE INVENTION

The invention relates to a device for stiffening the plates of a large-diameter multi-stage column that can be applied to any column that implements a flow of fluids within a medium of solid particles, called a granular medium.

A column that consists of a multiplicity of plates arranged along an approximately vertical axis, each plate supporting a granular solid bed and fluid or fluids that are used in the column passing through the different plates in series, is called a multi-stage column. In the text below, the plates are called distributor plates because they also ensure a function of injecting or drawing off a fluid that is added to or subtracted from the primary fluid that circulates inside the column.

The field of the invention is more particularly that of the adsorption processes in simulated moving beds (that will be denoted by the abbreviation SMB in the text below), used in particular for the separation of aromatic hydrocarbons, more particularly for the separation of xylenes and ethylbenzene.

It is common in the columns that are equipped with large-diameter plates to use support beams that make it possible to ensure a certain stiffening in the plates. These beams can be positioned under the plates and can be partially or totally immersed in the solid particles of the granular medium.

In the case where the column is loaded with solid particles by dumping the particles from the top of the column (so-called dense loading method), the zones that are located under the beams can be poorly loaded with particles, which can lead to the existence of an empty volume of particles under the beams. This phenomenon has undesirable effects on the operation of the device, such as the increase of the axial dispersion in the column and the reduction of the effectiveness of separation of the adsorption.

The invention essentially consists in using shaped beams such that during the loading of solid particles according to the dense loading method, dead volumes do not appear under the beams. The invention has the effect of improving the performance levels of reactive columns that often require a flow of fluids that is close to a piston-like flow, as well as an improvement of the separation performance levels of the SMB-type separation columns.

EXAMINATION OF THE PRIOR ART

In the separation column or reactor-type multi-stage processes, the distribution devices that are used can have several functions such as the injection or the draw-off of a flow of fluid in the reactor or the column at any level of said column.

It is generally desired that this function of injection or draw-off be carried out in a balanced and homogeneous manner over the entire column section. Actually, in general, each plate of the column is divided into a certain number of sectors, each sector having to be irrigated homogeneously, relative to the others.

Regarding the separation processes by multi-stage column adsorption, of the chromatography or SMB type, it is common, in particular for the large-diameter columns (i.e., within the context of the invention, greater than 2 meters), to resort to beams for supporting the plates.

These beams, generally positioned under the plates, are immersed in the solid particle bed. These beams are present in the column at the time of loading, and if this is done according to the dense loading method, the filling of the bed volume located under the beams generally is not perfect. Imperfect loading is defined as the fact that an empty volume of particles can form under the beam or an element of the latter during the loading, a volume that is called dead volume in the text below.

The repercussions of the presence of dead volumes under the beams on the performance levels of the process are difficult to estimate, and mock-up tests were conducted especially for developing this invention and for evaluating its impact on the performance levels of a reactive or adsorption column.

Regarding the hydrodynamics in a bed of solid particles, the effect of the internals immersed in the bed was the subject of published studies. It is possible to cite, for example, the article Application of Computational Fluid Dynamics to Fixed Bed Adsorption Calculations Effects of Hydrodynamics on the Laboratory and Industrial Scale" by F. Augier, C. Laroche, and E. Brehon, published in the journal Separation and Purification Technology 63, 2008, 466-474). The effect of the presence of beams is therefore perfectly quantifiable when the latter are completely immersed in the particle bed. In the present case, however, the problem is more complex because of the presence of a dead volume that is at least partially filled with liquid under the beams, which disrupts the separation more significantly than the effect of the obstacle itself.

The patents WO2006/027118A1, US2006/0108274 A1, EP0074815, and FR9309593 provide examples of multi-stage columns and distributor plates of processes in simulated moving beds.

SUMMARY DESCRIPTION OF THE INVENTION

This invention can be described as a device for stiffening plates of a large-diameter multi-stage column that adheres as well as possible to the piston-type flow of fluids. Piston is defined as a flow with a very low axial dispersion.

Large diameter is defined as a diameter of the column that is greater than 2 meters.

Each plate of the column supports a particle bed that can be, according to the application, catalyst particles in the case of a reaction column or adsorbent solid particles in the case of a simulated moving bed (SMB)-type separation column.

To stiffen each plate, a beam framework system that is placed above or below said plate is generally used. Within the context of this invention whose primary object is the application to the columns in an SMB, the beam framework system is placed below each plate of the column. This beam framework system is found immersed in the granular bed after the loading of the column, and the object of this invention is to maintain a state of flow of the fluid(s) circulating in the column that is as close as possible to a piston-like flow by preventing the formation below each beam of a dead volume.

This result is obtained by a suitable shaping of the lower surface of each beam, and it has been found that the optimal shaping of said surface corresponds to the shape of an essentially isosceles triangle, whereby the angle of two approximately equal sides of said triangle relative to the horizontal is between 20° and 40° and preferably between 25° and 35°.

Approximately equal is defined as an equality of the sides plus or minus 20%, and preferably plus or minus 10%.

Figure 6:
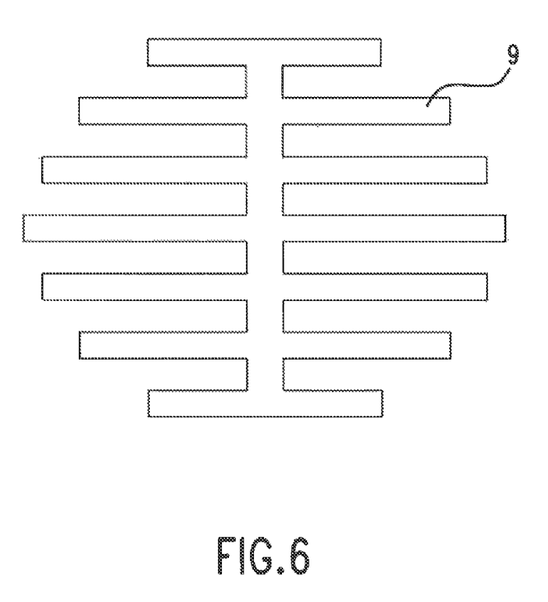
FIGS. 6 and 7 according to the invention, are perspective views of different embodiments of the beam framework.

According to a first beam framework diagram as shown in FIG. 6, the beams are divided up into a primary beam that is essentially aligned along a diameter of the column and a multiplicity of secondary beams that are perpendicular to the primary beam. Essentially aligned is defined as a beam combined with a diameter of the column plus or minus about 20 cm.

Figure 7:
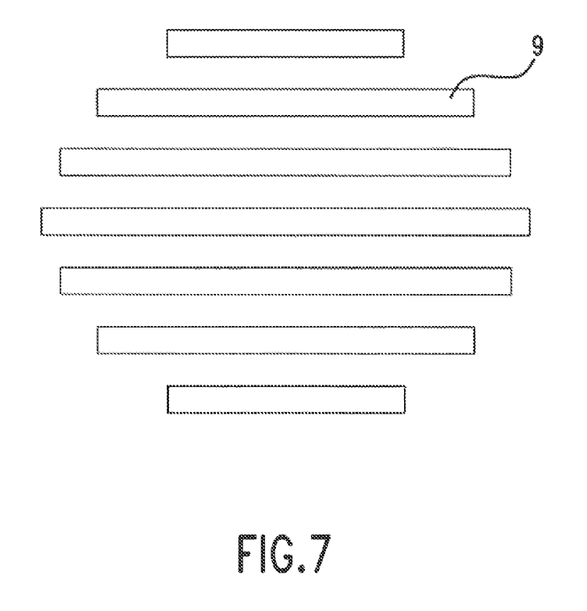

According to a second beam framework diagram as shown in FIG. 7, the set of beams is essentially parallel. Essentially parallel is defined as beams that can make an angle between them that is less than 20°, and preferably less than 10°.

Figure 8:
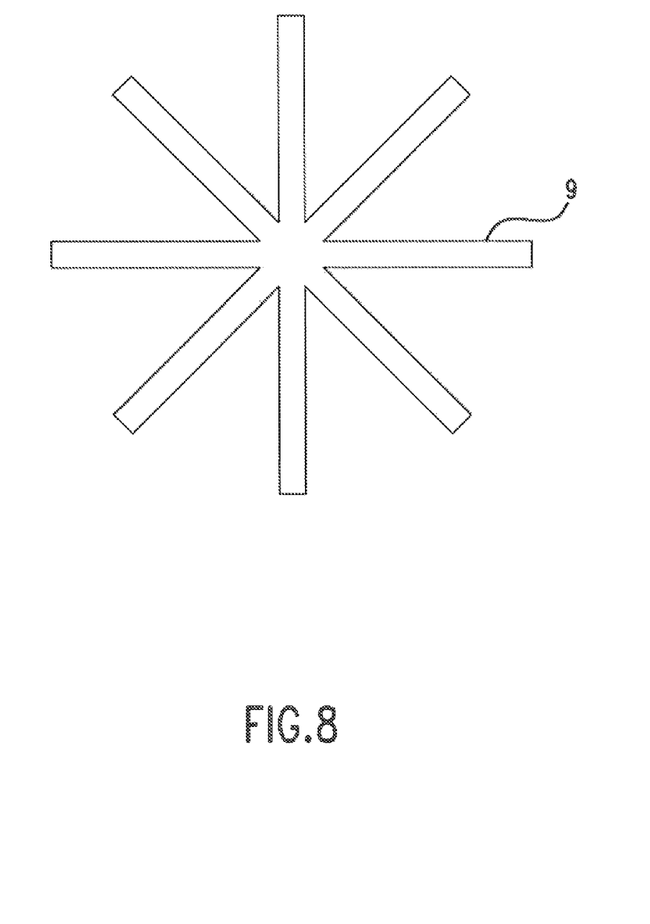
FIG. 8 is a plan view of radial beams within the column.

According to a third beam framework diagram according to FIG. 8, the different beams are arranged along radii.

This invention is compatible with all of the beam framework diagrams and applies to a majority of beams that constitute said beam framework.

In a preferred particular case, this invention applies to each of the beams that constitute the beam framework.

The triangular element that defines the shaping of the lower surface of each beam can either be included in the design of the beam or be added to the flat-bottom beams, which can offer an advantage if a standard flat-bottom beam framework system already exists.

More specifically, this invention can therefore be defined as a device for stiffening plates of a large-diameter multi-stage column, whereby each plate supports a particle bed, and the flow of at least one fluid passes through it from top to bottom, whereby said device consists of a number of beams that are located under the plate in question, each beam having a lower surface that is shaped like a triangle.

The angle of the two approximately equal sides of the triangle relative to the horizontal is between 20° and 40°, and preferably between 25° and 35°.

The stiffening device according to this invention makes it possible to improve the flow of the fluids inside of a column that comprises a number of plates that each bear a granular solid bed, a so-called multi-stage column.

The improvement of the flow in this context means that the flow comes as close as possible to a piston-like flow, i.e., a flow in which the axial dispersion of the fluid that passes through the different successive beds of the column is the weakest possible.

This piston-like flow characteristic is particularly important in the case of a reaction column and in the case of a separation column in SMB, because in large part it conditions the performance levels, either in terms of the desired product yield or in terms of selectivity.

In a general manner, the adsorbent solid or catalyst particles that form the granular bed of the multi-stage column have a diameter or an equivalent diameter of between 10 and 100 microns, and more particularly between 10 and 800 microns (1 µm=1 micron=$10^{-6}$ meter). Equivalent diameter is called the diameter of a sphere that preserves the surface to volume ratio of the particle that is being considered.

In the great majority of cases, the surface velocity of the liquid that circulates in the column is between 1 and 5 mm/s and more particularly between 1 and 2.5 mm/s.

The surface velocity is usually defined as the ratio of the volumetric flow rate of the fluid over the section of the column that is presumed empty of all obstacles.

DETAILED DESCRIPTION OF THE INVENTION

Figure 1A:
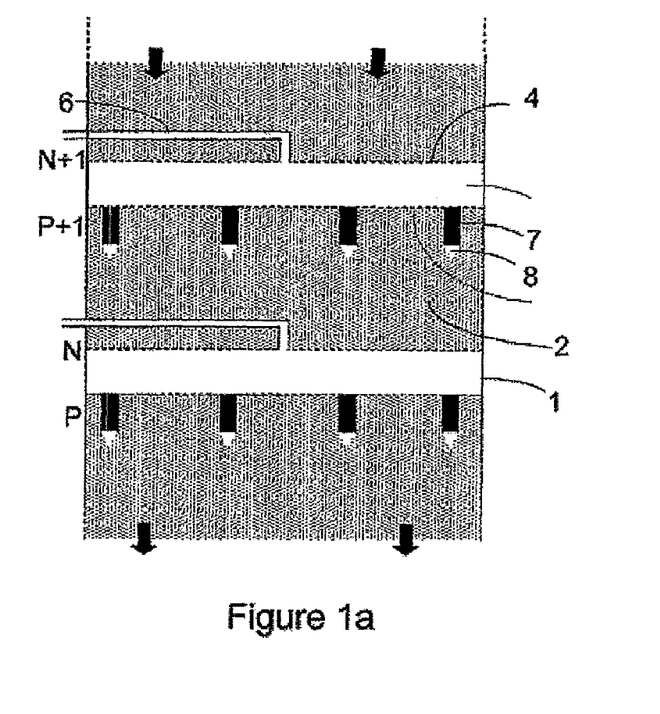
FIG. 1a according to the prior art is a schematic representation of plates that are present in a multi-stage column, beams that support the plates, and dead volumes that are present under the beams.

A multi-stage column as shown in FIG. 1a globally constitutes a granular medium, and the fluid that circulates between the different plates is generally a liquid in downward flow. The optional presence of gas in addition to the liquid flow does not alter the device of this invention that can therefore be applied to columns with gas and liquid mixed flows.

A column consists of a cylindrical chamber or ring (1) and comprises different distributor plates (4) that delimit beds (2) of solid particles or sieves.

The distributor plates (4) are supplied by networks of pipes (6) that are connected to the outside of the ring.

The function of the distributor plates (4) is to mix the liquid that comes from the upper bed with that injected by the network of pipes (6) or to draw off a fraction of the liquid that exits from the upper bed, according to a cyclical operation that alternates the functions, of injection and draw-off.

When the column is large in size, i.e., within the context of the invention, greater than 2 meters in diameter, it is often necessary to stiffen the plates with beams (7) so that said plates remain as horizontal as possible, despite the different mechanical and hydraulic constraints to which they are subjected.

The invention applies to the case where the plates are supported by beams, and more specifically to the case where the beams that support the plates are positioned under the plates. So as not to lose the column volume that is available for the catalyst or the adsorbent solid, the beams can be partially immersed in the sieve (2).

The beams are generally parallelepipedic in shape, with a dimension (width) that is clearly smaller than the other two (length, height). Therefore, width is called the smallest dimension of the beam that is being considered.

The lower surface of the beam is very generally a planar, or essentially planar, surface that we will refer to as a flat-bottom beam. This invention is compatible with any form of beam and in particular can apply to flat-bottom beams.

The filling of the sieve (2) that constitutes each bed between two plates can be implemented in different ways.

a) One particularly advantageous loading method consists in dropping the rain sieve from the top of the column because in this case, the grains arrange themselves to form a bed with low interstitial porosity. The process is then referred to as dense loading, a method that offers the advantage of maximizing the sieve mass that is present between two successive plates.

The dense loading takes place as follows:

The plate of level N is positioned on the column section, carried by the beams P.

The beams P+1 that support the plate of level N+1 immediately above the plate of level N are also installed, but not the plate N+1, so as to be able to load the sieve.

The sieve is then tipped to rain onto the plate N up to its maximum level.

After loading, the plate N+1 is positioned on the beams P+1, and the same procedure is applied to fill the bed above the plate N+1.

One possible drawback when the dense loading method is used in the presence of beams is the possible poor loading of the sieve under the beams. When the beams are rectangular in shape, or more generally have a flat bottom, the tipped sieve does not fall directly under the beams, because the latter cover a fraction of the surface that is not accessible to the solid particles during the loading.

Figures 2A, 2B:
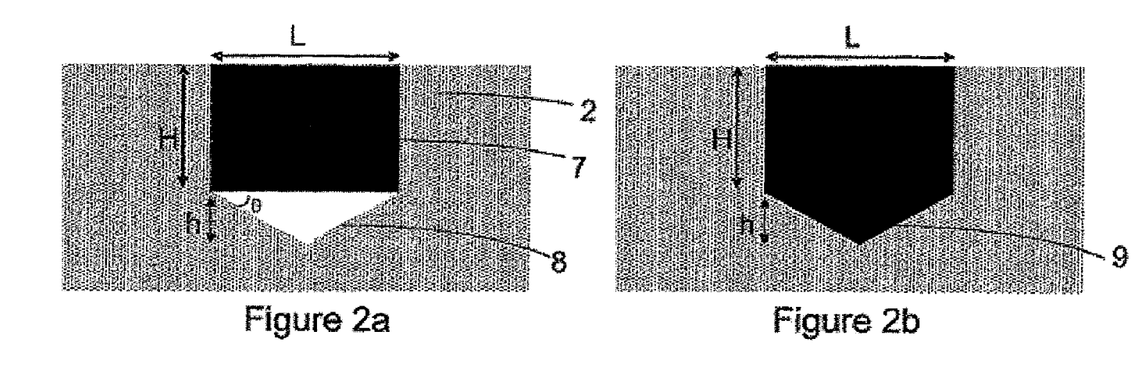
FIG. 2a according to the prior art is a detail of FIG. 1a at the level of a dead volume under a beam.
FIG. 2b according to the invention is a detail of FIG. 1b at the level of the shaping of the beam.

The zone that is between the bottom of the beams P+1 and the top of the plate located immediately below, i.e., the plate of level N, is called the shadow zone because the sieve that comes from the top of the column during the filling cannot access it directly. This zone therefore fills more slowly than the open zones, and the result is a sieve height deficiency, as illustrated in FIG. 2a.

This sieve height deficiency phenomenon generates the formation of a furrow that is located at the base of the lowest part of the beam that is being considered, a furrow of a maximum depth h.

Numerous experiments have shown that the furrow has a triangular section, which is approximately constant over the entire length of the beam.

The depth h of the furrow is linked to the width of the beam L and to the angle θ that is formed by the sides of the furrow relative to the horizontal (cf. FIG. 2a):

$$h = \frac{L \tan \theta}{2}$$

Mock-up loading tests with the zeolite-type sieve with a mean grain size of about 650 μm have shown that the angle θ was generally between 30 and 35°.

Figure 3:
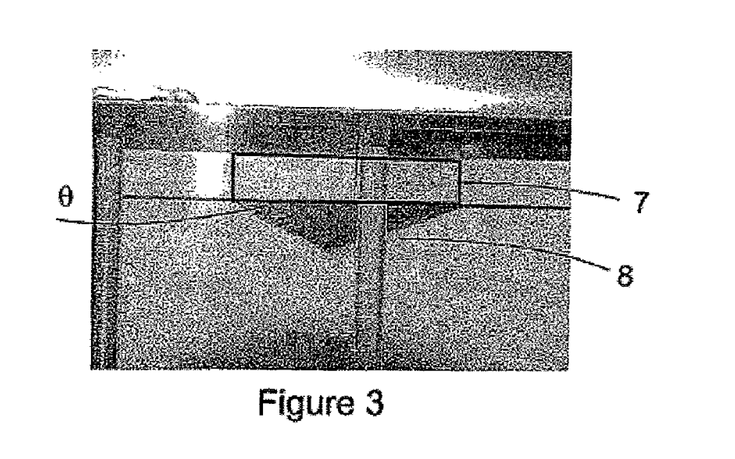
FIG. 3 according to the prior art is a photo of a dead volume that is reproduced in mock-up during a dense loading with solid particles.

FIG. 3 shows a dead volume photo (8) that is observed in cold mock-up under an obstacle (7) that is 10 cm in width. The angle θ of the furrow that is measured relative to the horizontal is between 30 and 35°.

Figure 4A:
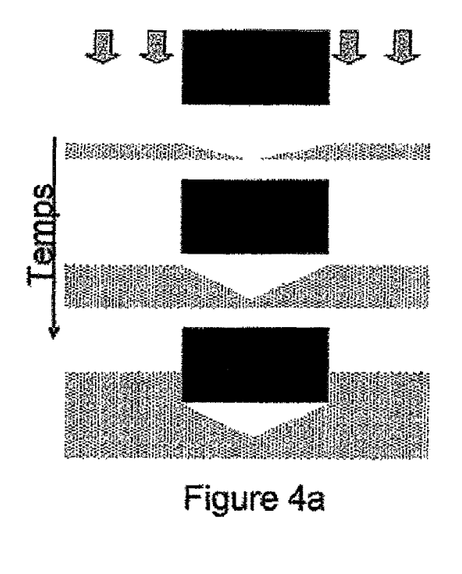
FIG. 4a according to the prior art is a schematic view of the formation of the dead volumes under the beams during a dense loading.

The formation process of the dead volume during the sieve loading is shown in diagram form in FIG. 4a.

Table 1 below summarizes the experimental values of angle θ and the height of the furrow (h) obtained on mock-ups for different values of beam width (L) and height (H) and different loading speeds of the sieve (expressed in cm/minute).

TABLE 1

| Width (cm) | Height (cm) | Loading Speed (cm/mn) | Angle (°) | Slope Height (cm) |
|---|---|---|---|---|
| 5 | 0.1 | 1 | 31 | 1.5 |
| 5 | 0.2 | 1 | 33 | 1.6 |
| 5 | 0.4 | 1 | 32 | 1.6 |
| 5 | 0.4 | 2 | 35 | 1.7 |
| 5 | 0.4 | 0.5 | 33 | 1.6 |
| 10 | 0.4 | 1 | 32 | 3.2 |
| 20 | 0.4 | 1 | 32 | 6.2 |

TABLE 1-continued

| Width (cm) | Height (cm) | Loading Speed (cm/mn) | Angle (°) | Slope Height (cm) |
|---|---|---|---|---|
| 10 | 0.4 | 1 | 35 | 3.5 |
| 10 | 0.4 | 1 | 33 | 3.2 |
| 10 | 0.4 | 1 | 32 | 3.1 |
| 10 | 0.4 | 1 | 34 | 3.3 |

It is noteworthy to point out that in the range of explored values, the angle θ is encompassed in a relatively narrow range encompassed between 30 and 35°.

The invention consists in using beams whose lower surface is triangular in shape, whereby the triangle optimally assumes the shape of the furrow that is noted experimentally.

Figure 1B:
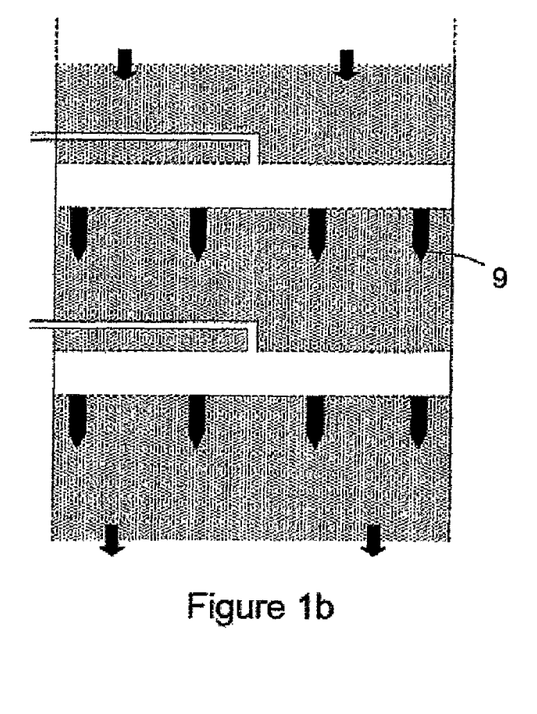
FIG. 1b according to the invention is a representation of plates that are present in a multi-stage column and shaped beams that support the plates.

These are then called shaped beams (9) according to the invention, as shown in FIGS. 1b and 2b.

Figure 4B:
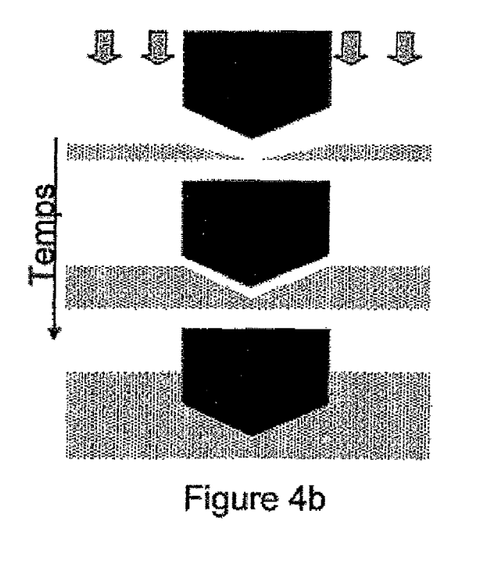
FIG. 4b according to the invention is a schematic view of the effect of filling dead volumes due to the shaping of beams during the dense loading.

Whereby the lower surface of the shaped beams has a shape that is similar to that of the dead volume (or furrow) that is located under a flat-bottom beam, the sieve, during the dense loading, is divided up around the beam without leaving dead volume. The loading of the sieve close to the shaped beams (9) is shown in diagram form in FIG. 4b.

b) It can be noted that the problem mentioned for the loading, so-called dense loading, does not exist for the other type of loading, so-called "sleeve" loading, i.e., a loading in which an operator monitors the loading surface. This loading prevents the formation of dead volumes but leads to a lower loading density than the so-called dense loading.

EXAMPLE

The effectiveness of the device according to the invention has been tested using Plexiglas mock-up tests. The mock-up reproduces a portion of a bed that is 1 m in height, 60 cm in width, and 18 cm in depth. The mock-up is equipped with distributing and collecting devices at the top and bottom so as to make the overall flow in the mock-up as much like a piston as possible, i.e., with minimal axial dispersion. The mock-up is filled with glass balls that are 2 mm in diameter, according to the dense loading method.

Three configurations, denoted A, B, and C, are studied:

Configuration A: Absence of beam

Configuration B: Flat-bottom beam that is 10 cm in width, 18 cm in depth, and 40 cm in height. The beam is positioned at the top of the bed; therefore, the base of the beam is located at 60 cm from the bottom of the mock-up.

Configuration C: Shaped beam according to the invention, i.e., a beam that is identical to that of case B extended at its lower end by an essentially isosceles triangle in a manner that is similar to FIG. 2C. The height of the triangle is h=3 cm. The angle θ is 32°. An essentially isosceles triangle is defined as a triangle that has two equal sides plus or minus approximately 20%, and preferably plus or minus approximately 10%.

The flow in the bed is characterized for the three cases by the so-called dwell time distribution method, as presented in detail in numerous chemical engineering works, including "*Génie de la reaction chimique [Chemical Reaction Engineering]*, D. Schweich, Tec & Doc, 2001, Paris."

The tests are conducted with water, circulating at the surface velocity of 1.5 cm/s (empty drum speed).

At time t=0, a point injection of a saline solution is made at the top of the mock-up.

The conductivity is measured in the mock-up output pipe. The signals are standardized so as to have surfaces under the curve of 1 (dimensionless) and a zero value at t=0.

The signals are also expressed based on the relative perforation time, defined as the physical time from the injection in which the mean dwell time in the mock-Up is subtracted. This treatment over time makes it possible to compare the form of the output signals by removing fluctuations of dwell time or signal amplitude differences.

This treatment therefore makes it possible to analyze the piston-like nature of the flow in the mock-up. The more the output signal is narrow and high, the more piston-like the flow. Conversely, the more the signal is spread out, the less piston-like the flow, i.e., the more it is axially dispersed.

Figure 5:
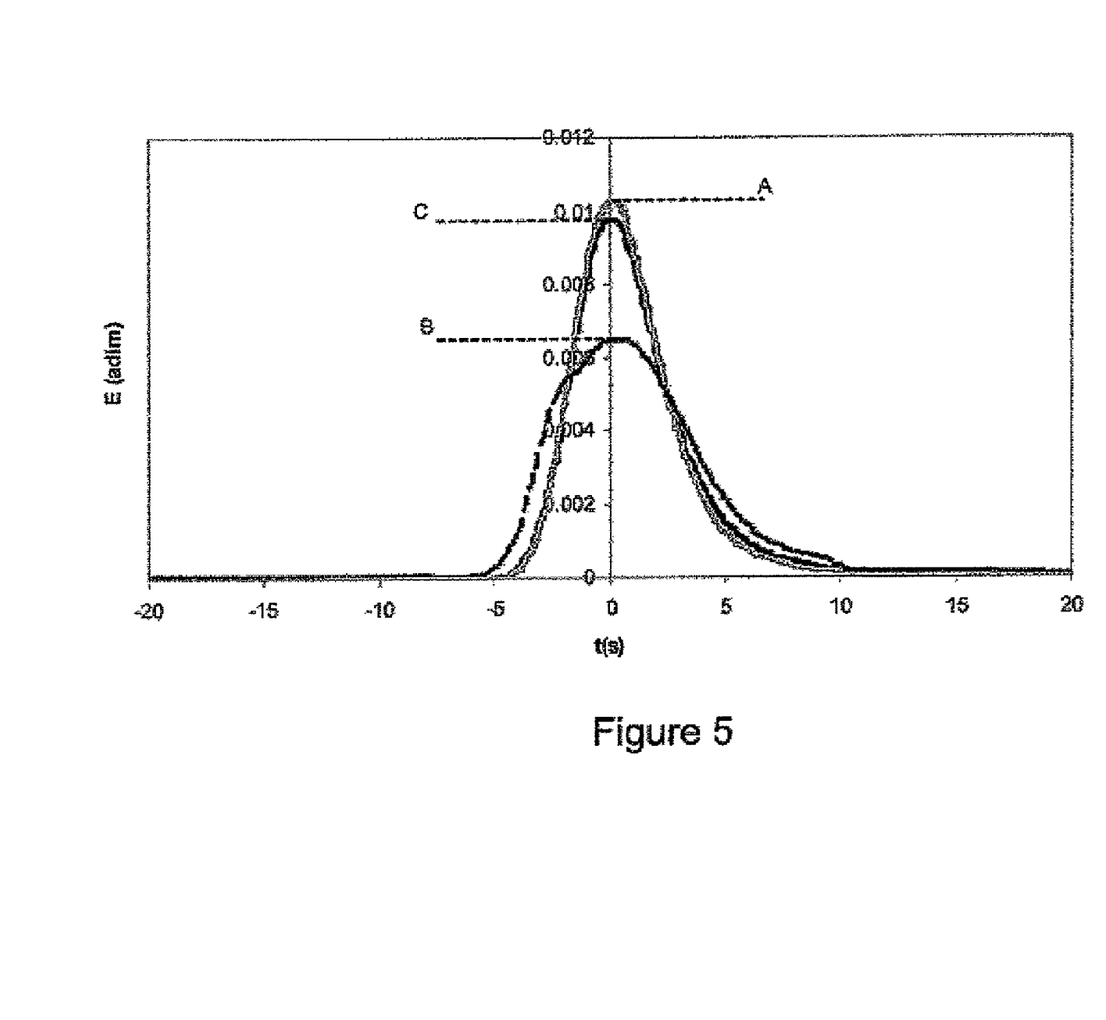
FIG. 5 is a graph that compares the distribution signals of the dwell time in the absence of a beam (case A), in the presence of a standard flat-bottom beam (case B), or in the presence of a shaped beam according to the invention (case C).

The results of this experimental study are shown in FIG. 5.

Case A without a beam provides the highest signal, whose flow is the most piston-like.

Case B, with a flat-bottom beam according to the prior art, and a dead volume that is formed during the dense loading, provides a signal that is less high and more spread out than case A, which shows that the beam generates axial dispersion and that the flow is less piston-like.

Case C, with a shaped beam according to the invention, provides a signal that is very slightly lower and wider than case A, but quite higher than case B. The flow that is generated by case C is therefore almost as piston-like as case A without a beam.

The piston-like nature of each flow can also be quantified in terms of the number of theoretical stages (NTS). The NTS is calculated by regressing a cascade hydrodynamic model of NTS reactors that are stirred in series. The higher the NTS, the more piston-like the flow (and the weaker the axial dispersion). The results, which are recorded in Table 2 below, show the advantage of the invention for improving the flow in the presence of beams.

TABLE 2

| | NET |
|---|---|
| Configuration A Without a Beam | 162 |
| Configuration B Flat-Bottom Beam | 69 |
| Configuration C Shaped Beam | 145 |

The degradation of the flow is naturally based on the number of beams that are present in the column, expressed in terms of the ratio between the projected surface of all of the beams and the section of said column. This surface fraction that is occupied by all of the beams is on the order of 2 to 7% in the industrial columns, against 17% to 20% in the mock-up. The impact of the beams on the flow is therefore much less in the industrial columns than in the mock-up, which means that the approach to the piston-like flow will be implemented even better on an industrial column that is equipped with shaped beams according to the invention relative to the results that are obtained in the mock-up.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 09/02.803, filed Jun. 10, 2009 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. The substantially vertical multi-stage column with a diameter of more than 2 meters, comprising a multiplicity of vertically spaced apart and substantially horizontal plates suitable for holding superposed beds of solid particles, said horizontal plates being supported by generally horizontal beam frameworks for providing rigidity to said plates and allowing a flow of at least one fluid to pass through from top to bottom of said multi-state column, said beam frameworks comprising a plurality of beams (9) located under and in contact with said horizontal plates, each beam (9) having a generally planar upper surface and a generally planar bottom surface, said bottom surface forming in part a horizontal plane and having at least in part a triangular element having an apex extending downwardly from said horizontal plane, said triangular element being suitable for immersion into a bed of solid particles.

2. The multi-stage column with a diameter of more than 2 meters according to claim 1, wherein two essentially equal sides of said triangular element form an angle θ relative to the horizontal plane of between 20° and 40°.

3. The multi-stage column according to claim 2, wherein said angle θ is between 25° and 35°.

4. The multi-stage column with a diameter of more than 2 meters according to claim 1, in which the beams (9) are divided up into a primary beam aligned essentially along a diameter of the column and a plurality of secondary beams essentially perpendicular to said primary beam.

5. The multi-stage column with a diameter of more than 2 meters according to claim 1, in which the beams (9) are all essentially parallel to each other.

6. The multi-stage column with a diameter of more than 2 meters according to claim 1, in which the beams (9) are all essentially aligned along horizontal radii of said multi-stage column.

7. The multi-stage column with a diameter of more than 2 meters according to claim 1, comprising solid particles constituting granular beds (2) on said horizontal plates.

8. The multi-stage column with a diameter of more than 2 meters according to claim 7, wherein two essentially equal sides of said triangular element form an angle θ relative to the horizontal plane of between 20° and 40°.

9. The multi-stage column with a diameter of more than 2 meters according to claim 7, in which the beams (9) are divided up into a primary beam aligned essentially along a diameter of the column and a plurality of secondary beams essentially perpendicular to said primary beam.

10. The multi-stage column with a diameter of more than 2 meters according to claim 7, in which the beams (9) are all essentially parallel to each other.

11. The multi-stage column with a diameter of more than 2 meters according to claim 7, in which the beams (9) are all essentially aligned along horizontal radii of said multi-stage column.

12. The multi-stage column according to claim 7, wherein the solid particles have a diameter or equivalent diameter that is between 300 and 800 microns.

13. A multi-stage column according to claim 7, wherein the beams are generally parallel piped in shape.

14. The multi-stage column of claim 1 further comprising a network of pipes connected to the plates, a distributing device at the top of the multi-stage column, and a collecting device at the bottom of the multi-stage column.

15. The multi-stage column according to claim 1, wherein the beams are generally parallelepiped in shape.

* * * * *